US007409364B1

(12) United States Patent  (10) Patent No.: US 7,409,364 B1
Barton et al.  (45) Date of Patent: Aug. 5, 2008

(54) FINANCIAL ADVICE STRATEGY SYSTEM

(75) Inventors: Barry P. Barton, Wilmington, DE (US); Vicki L. Dougherty, Wilmington, DE (US); Jon Forst, New Castle, DE (US); Michael Nikithser, Allison Park, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 442 days.

(21) Appl. No.: 09/391,460

(22) Filed: Sep. 8, 1999

(51) Int. Cl.
*G06Q 40/00* (2006.01)
(52) U.S. Cl. .......................................... 705/35; 705/42
(58) Field of Classification Search ............. 705/10–43; 706/47; 395/63
See application file for complete search history.

(56) References Cited

U.S. PATENT DOCUMENTS

| 3,634,669 | A |   | 1/1972  | Spontak        |
|-----------|---|---|---------|----------------|
| 4,598,367 | A |   | 7/1986  | Freiman        |
| 4,642,768 | A |   | 2/1987  | Roberts        |
| 4,736,294 | A |   | 4/1988  | Le Grande      |
| 4,739,478 | A |   | 4/1988  | Finnerty       |
| 4,774,664 | A |   | 9/1988  | Campbell et al.|
| 4,831,526 | A |   | 5/1989  | Luchs          |
| 5,220,500 | A |   | 6/1993  | Baird          |
| 5,227,874 | A |   | 7/1993  | Von Kohorn     |
| 5,481,647 | A |   | 1/1996  | Brody          |
| 5,523,942 | A |   | 6/1996  | Tyler          |
| 5,583,778 | A |   | 12/1996 | Wind           |
| 5,592,590 | A |   | 1/1997  | Jolly          |
| 5,594,837 | A | * | 1/1997  | Noyes          |
| 5,606,496 | A |   | 2/1997  | D'Agostino     |
| 5,611,052 | A |   | 3/1997  | Dykstra        |
| 5,649,116 | A |   | 7/1997  | McCoy          |
| 5,655,085 | A |   | 8/1997  | Ryan           |
| 5,671,409 | A |   | 9/1997  | Fatseas et al. |
| 5,717,865 | A |   | 2/1998  | Stratmann      |
| 5,721,831 | A |   | 2/1998  | Waits et al.   |
| 5,732,397 | A |   | 3/1998  | DeTore         |
| 5,764,923 | A | * | 6/1998  | Tallman et al. .................. 705/3 |
| 5,765,144 | A |   | 6/1998  | Larche         |
| 5,774,878 | A |   | 6/1998  | Marshall       |

(Continued)

OTHER PUBLICATIONS

Lee A Spirer, "When bad credit behavior becomes the norm", Credit World, St Lous: Jul./Aug. 1997. vol. 85, Issue 6, p. 18, 3 pages.*

(Continued)

*Primary Examiner*—Frantzy Poinvil
(74) *Attorney, Agent, or Firm*—Hunton & Williams

(57) ABSTRACT

A system and method are disclosed for analyzing an individual's financial information and generating advice related to financial payment and negotiation strategies specifically tailored to the individual's current economic situation. This process is accomplished through the use of a primary support graphical user interface (GUI) which contains, among other things, descriptive icons representing distinct financial scenario categories. A user obtains information regarding the individual's current economic situation and selects a descriptive icon which most closely corresponds to that situation. A graphical window is then displayed which contains a set of predetermined questions and corresponding predetermined answers. The user inputs answers to the questions based on the individual's input. The user then instructs the system to generate advice on payment options and negotiation strategies most relevant to the individual's situation. The advice is displayed and the user relates the advice to the individual.

15 Claims, 9 Drawing Sheets

U.S. PATENT DOCUMENTS

| | | | |
|---|---|---|---|
| 5,774,883 A * | 6/1998 | Andersen et al. | 705/35 |
| 5,852,811 A | 12/1998 | Atkins | |
| 5,875,437 A | 2/1999 | Atkins | |
| 5,913,202 A | 6/1999 | Motoyama | |
| 5,920,848 A | 7/1999 | Schutzer | |
| 5,930,775 A | 7/1999 | McCauley | |
| 5,987,434 A | 11/1999 | Libman | |
| 6,009,415 A | 12/1999 | Shurling | |
| 6,018,722 A | 1/2000 | Ray | |
| 6,021,397 A * | 2/2000 | Jones et al. | 705/36 |
| 6,061,665 A * | 5/2000 | Bahreman | 705/40 |
| 6,088,686 A | 7/2000 | Walker | |
| 6,199,077 B1 | 3/2001 | Inala | |
| 6,202,053 B1 | 3/2001 | Christiansen | |
| 6,212,494 B1 * | 4/2001 | Boguraev | 704/9 |
| 6,298,335 B1 * | 10/2001 | Bernstein | 705/40 |
| 6,315,196 B1 * | 11/2001 | Bachman | 235/380 |
| 6,446,076 B1 * | 9/2002 | Burkey et al. | 705/36 |

OTHER PUBLICATIONS

Slide brief entitled "User-Centered Intelligent Software Solutions," dated Oct. 1996 (27 pages).

Brochure entitled "All customer interactions are not created equal," undated (8 pages).

Slide brief entitled "Knowledge-Based Agents—Optimizing Your Client Interactions" dated Jan. 1997 (16 pages).

Slide brief entitled "More Information about Knowledge-Based Agents" dated Apr. 23, 1997 (27 pages).

Slide brief entitled "KBA for Strategy Selection," dated Apr. 1997 (4 pages).

Brochure entitled "Knowledge-Based Agents: How to Optimize Your Customer Interactions," undated (3 pages).

Asch, Latimer, How the RMA/Fair, Isaac credit-scoring model was built, Journal of Commercial Lending, vol. 77, No. 10, pp. 10-16, Jun. 1995.

Taylor, Clair et al., Card Issuers Turn to Scoring as They Face Increasing Risk, Financial Services Report, vol. 8, No. 15, p. 1, Jul. 24, 1991.

Roger, John C. et al., A Credit Scoring Model to Evaluate the Credit Worthiness of Credit Card Applicants, Developments in Marketing Science, vol. 5, 1982.

Hickman, Michael, Using Software to Soften Big-Time Competition, Bank Systems & Technology, vol. 31, No. 8, pp. 38-40, Jun. 1994.

Sullivan, Deidre, Scoring Borrower Risk, Mortgage Banking, vol. 55, No. 2, pp. 94-98, Nov. 1994.

Jameson, Ron, Expanding Risk Management Strategies: Key to Future Survival, vol. 84, No. 5, Credit World, pp. 16-18, May 1996.

Friedland, Marc, Credit Scoring Digs Deeper into Data, Credit World, vol. 84, No. 5, pp. 19-23, May 1996.

Credit Scoring New Markets, Bank Technology News, vol. 9, No. 7, p. 1, Jun. 1996.

Carey, James J., The Sub-Prime Credit Market: Identifying Good Risks for Unsecured Cards vol. 85, No. 1, Credit World, pp. 13-15, Sep. 1996.

Opportunity Knocks at Scoring's Door, Collection & Credit Risk, vol. 2, No. 4, Apr. 1997.

Makuch, William J., Managing Consumer Credit Delinquency in the US Economy: A Multi-Billion Dollar Management Science Application, Interfaces, pp. 90-109, Feb. 1992.

Fred Fortner, There Must be a Better Way, Mortgage Banking vol. 53, No. 2, pp. 12-22, Nov. 1, 1992.

* cited by examiner

| | BANKRUPTCY MENTIONED | CM IS THINKING ABOUT FILING FOR BANKRUPTCY OR EXPLICITLY STATES, "I AM GOING TO FILE FOR BANKRUPTCY." |
|---|---|---|
| | INCOME REDUCED | CM HAS SOME INCOME, BUT NOT AS MUCH AS IN THE PAST, DUE TO PAY CUT, UNEMPLOYMENT, MEDICAL BILLS, ETC...CM IS ABLE TO PAY SOME BILLS. |
| | NO MONEY | CM HAS NO INCOME OR VERY LITTLE MONEY, JUST ENOUGH TO COVER ESSENTIALS. |
| | REFUSAL | CM REFUSES TO PAY FIRST USA. |
| | UNMOTIVATED | CM DOESN'T CARE ABOUT PAYING FIRST USA. THEY HAVE THE MONEY TO PAY, BUT THEY DO NOT SEE THE IMPORTANCE OF PAYING ON TIME. |

| First USA Bank - First Support: V5.7.1 | Logon Time: 09:59 AM | CSR ID: COG TEST DVOP: |
|---|---|---|
| Date: 03/01/99 Elapsed Load Time: 4 Time: 10:53 AM SE: Running | Sequence: 5 5 Accounts for Today | Accounts Worked: Amount Promised: FIRST USA |

MC - FCC, AUBURN UNIVERSITY ALUMNI

Name: Smith, John
Acct: 5417-1234-5678-9876  [Update]
SSN: 222-33-4444  WWN: 0. 310
H: (302) 444-8745  W: (302) 565-9451
362 Park Lane  [Change]
Anytown  DE 77777-7777

External Status: E-Revoked

| Amt Due: | $333.00 |
| Amt Delq: | $263.00 |
| Days Delq: | 146 |
| Balance: | $2803.78 |
| Credit Line: | $3000.00 |
| Avail Credit: | $196.00 |
| Last Payment: | 09/25/98 $134.00 |
| Last Monetary: | 09/25/98 P-Payment |

Suggestions
- Eligible for EFFORT: $120
  Eligible for ASSIST
- Due Date is: 02/27/99.

First Coach

Query Panel — Advice

CM's reason for reduction in income?
○ Unemp./Overext.   ○ Medical/Disability
○ Marital/Divorce    ○ Death in family Situation should improve in
○ 1-3 months    ○ 3-6 months
○ 6-12 months   ○ Don't know         ← 77

How does CM plan to handle this situation?
○ Looking for job   ○ Court settlement
○ Bank loan(s)      ○ Don't know/other  ← 83

QUICK REFERENCE OF
○ Consequences   ○ Benefits
○ Sources of money  ○ Job sources

[Advice] 85  79   97   [Clear All] 95  [Close] 81  99

Control Panel

WHEN YOU SELECT A FIRST COACH CALL TYPE ICON FROM THE ADDRESS PORTION OF THE FIRST SUPPORT SCREEN, THE FIRST COACH WINDOW WILL APPEAR.

NOTE: THE QUESTIONS THAT APPEAR IN THE QUERY PANEL WILL VARY DEPENDING ON WHICH CALL TYPE ICON YOU SELECTED.

YOU CAN REPOSITION THIS WINDOW ANYWHERE ON YOUR SCREEN, BY CLICKING ON THE BLUE BAR AT THE TOP OF THE FIRST COACH WINDOW AND DRAGGING IT TO ANY LOCATION ON THE FIRST SUPPORT SCREEN.

First Coach

| Query Panel | Advice |
|---|---|
| Why is CM refusing to pay?<br>⦿ Dispute     ○ Divorce/Marital<br>○ Acct terms/Clsd  ○ Dissatisfied/Other<br><br>If DISPUTE select type of dispute:<br>⦿ Merch. dispute  ○ Repricing<br>○ Misapp. pymt    ○ Other<br><br>If DISSATISFIED select reason:<br>○ Fees/Fin chrgs  ○ Service/Misinfo<br>○ Too many calls  ○ Unresolved issue | * Letter sent w/in 60 days of statement date?<br><br>* Pymts still need to be made for at least 2% of the undisputed amount.<br><br>* EDUCATE CM ON THE FACTS OF THE ACCT:<br>-> Possibility of further action.<br>-> Explain next steps in collection process [explain what charge off means].<br>-> Stress differences between Acct. Past Due & acct. Charged Off.<br><br>* MOTIVATE ON BENEFITS OF BRINGING ACCT CURRENT:<br>-> The choice is really theirs. You are there to help them |

[Advice]   BK Ment   Inc Red   No Money   Refusal   Unmotiv   [Clear All]   [Close]

---

FIRST COACH PROVIDES YOU WITH ASSISTANCE ON CALLS IN WHICH THE CARDMEMBER REFUSES TO PAY FIRST USA BECAUSE OF ISSUES RELATING TO:

- DISPUTES
- ACCOUNT TERMS/ACCOUNT CLOSED
- DIVORCE/MARITAL CIRCUMSTANCES
- DISSATISFIED/OTHER SITUATION

NOTE: IF THE CARDMEMBER CITES "DISPUTE" OR "DISSATISFACTION" AS THE REASON FOR REFUSING TO PAY FIRST USA, YOU WILL NEED TO ANSWER THE SECOND OR THIRD QUESTION IN THE QUERY PANEL TO PROVIDE FIRST SUPPORT WITH FURTHER INFORMATION REGARDING THE CARDMEMBER'S SITUATION.

FIG. 8

First Coach

Query Panel

Why is CM unmotivated?
- ◉ Personal reason   ○ Svc.fail/Misinfo
- ○ Acct trms/Clsd   ○ Credit damaged Select profile which fits CM:
- ○ Student   ◉ Divorced
- ○ Retired   ○ Other Does CM have money to pay FUSA?
- ○ Yes   ◉ No QUICK REFERENCE OF:
- ○ Consequences   ○ Benefits — 101
- ◉ Both — 103

Advice

* Consequences of not paying:
=> Acct could be charged off
=> Negative credit in Credit Bureau Report
=> Assessment of Fees
=> Will be contacted every 5 to 7 days
=> Cannot get new loans
=> Cannot rent cars, stay in hotels, or travel
=> Will not have credit card in case of Emergencies
=> Future job prospects may be affected

****************************************

* Benefits of pymt and bringing Acct current:
=> Save money on Fees
=> Rebuild credit

[Advice]  BK Ment  Inc Red  No Money  Refusal  Unmotiv  [Clear All]  [Close]

IN THE UNMOTIVATED, INCOME REDUCED AND NO MONEY QUERY PANELS, YOU HAVE THE ABILITY TO LIMIT THE NUMBER OF CATEGORIES OF ADVICE STATEMENTS THAT ARE PROVIDED TO YOU IN THEIR RESPECTIVE ADVICE WINDOWS. SIMPLY CLICK ON THE TYPE OF FEEDBACK TYPE(S) YOU WOULD LIKE TO VIEW.

FIG. 9

FINANCIAL ADVICE STRATEGY SYSTEM

FIELD OF THE INVENTION

The present invention relates to an interactive computer system for generating advice related to financial payment strategies that are tailored to a particular individual's changing economic circumstances. The system also generates customer negotiation advice based on the way in which an individual personally interacts with a system user when discussing the individual's economic circumstance. This process is accomplished through the use of descriptive icons displayed on a graphical user interface (GUI), each of which corresponds to a specific financial scenario. By using these descriptive icons, a user may readily obtain financial and other advice that is specifically tailored to the individual's current economic circumstance.

BACKGROUND OF THE INVENTION

For a variety of reasons, people often find themselves unable or unwilling to pay their existing financial debt obligations. For example, a person can lose his or her job, suffer a serious accident or be struck down by a debilitating illness. As a direct result of such events, people may find themselves unable to work and, thus, suffer from a substantial reduction in income. In some of these cases, a person may receive supplemental income in the form of unemployment or disability benefits, while in other more unfortunate cases, a person may not receive supplemental income of any kind. Indeed, even if supplemental income is received, such benefits typically last only for a limited time, or they may fail to adequately compensate an individual for the loss of their current income. Moreover, some people facing significant financial problems declare personal bankruptcy in order to alleviate their personal debt.

A number banks and other financial institutions have developed alternative payment options under which customers can restructure their existing debt obligations during times of economic crisis when, due to circumstances such as those described above, they are presently unable to make scheduled debt payments. This problem often arises in the context of credit card debt due to a number of factors, including, the proliferation of credit cards issued and the spending habit's of cardholders. In an effort to manage the risk associated with this situation, banks, credit unions and other financial institutions are seeking ways to collect outstanding credit card debt short of allowing customers to default on their obligations. This enables banks and other such institutions to avoid losses and the costs associated with the collection process for delinquent accounts.

Alternative payment options may range from relatively simple strategies, such as deferring a payment for a limited time, to more complex strategies, such as a flexible payment program under which customers are permitted to make reduced payments based on a percentage of their current income.

The alternative payment options best suited to a customer vary depending upon numerous factors, including, but not limited to: the customer's current debt obligations; the number and amount of such obligations; the reason(s) for which the customer cannot meet those obligations; the financial resources upon which the customer can draw, if any; and the customer's credit history. Consequently, identifying, analyzing and tracking the payment options available for a given individual's financial situation is typically a complex and time consuming task. This complexity is compounded by the fact that an institution's alternative payment options, as well as an individual's financial circumstances, often change periodically. Thus, payment options best suited to a customer's financial condition will vary as time passes and circumstances change.

Customer Support Representatives (CSRs) at banks, for example, who assist customers in identifying, analyzing and implementing alternative payment programs, typically do so on a transaction by transaction basis. As a result, it is sometimes difficult to identify the payment option(s) best suited and most beneficial to a customer and the bank.

In addition, people in financial difficulty often experience intense anxiety, anger, despondency and other negative feelings, often making such people difficult to interact with personally when discussing their financial problems. Currently, CSRs at banks and other financial institutions tend to rely on their own communication skills when interacting with customers under tense and stressful conditions. Yet, even in cases where CSRs are trained in communicating with customers under such conditions, it is nevertheless difficult to ensure that appropriate responses are uniformly provided.

Thus, there exists a need for an efficient, user-friendly, interactive system capable of integrating pertinent information regarding a customer's financial condition, analyzing this integrated information, and generating payment options and other advice individually tailored and best suited to the customer's financial circumstances. At present such a system does not exist.

SUMMARY OF THE INVENTION

It is one object of the present invention to resolve these and other drawbacks.

It is one object of the present invention to provide a system and method to advise customers regarding alternative payment options for their current debt obligations.

It is another object of the present invention to assist users in advising customers of alternative payment options for their current debt obligations.

It is another object of the present invention to analyze a customer's financial information.

It is another object of the present invention to generate payment options and other advice specifically tailored to a customer's current financial condition based on the customer's analyzed financial information.

It is yet another object of the present invention to enable a user to obtain information regarding payment options specifically tailored to a customer's current financial condition using graphical icons.

It is another object of the present invention to provide advice to assist and otherwise guide a user in interacting with individuals that the user is advising.

Other features and aspects of the present invention will be apparent from the drawings and detailed description of the invention.

BRIEF DESCRIPTION OF THE DRAWINGS

FIG. 4 depicts a support GUI containing descriptive icons and other graphical and textual information according to one embodiment of the present invention.

FIG. 5 depicts one coach window according to the present invention, overlaying a portion of the support GUI, and showing a query panel and advice panel.

FIG. 8 depicts another coach window according to the present invention showing a query panel and advice panel.

FIG. 9 depicts another coach window according to the present invention showing a query panel and advice panel.

DETAILED DESCRIPTION OF THE PREFERRED EMBODIMENTS

The preferred embodiments of the present invention provide a system and method for generating advice related to financial payment options specifically tailored to an individual's economic circumstances and for generating customer negotiation advice based on the way in which an individual personally interacts with a system user when discussing the individual's economic circumstances. Among other things, the system generates substantive advice on topics such as the positive benefits derived from making scheduled payments, the negative consequences arising from not making such payments, and information regarding possible alternative sources of income. The preferred embodiments also provide a system and method for generating various approaches to negotiations between an individual and a representative of an entity with which the individual has a financial relationship. By way of example, the present invention and preferred embodiments described herein are discussed in the context of credit card operations at a bank. In this context, the present invention will preferably be used by Customer Support Representatives (CSRs) employed by the bank whose job, among other things, is to interact with the bank's credit card holders (hereinafter referred to as customers).

Figure 1:
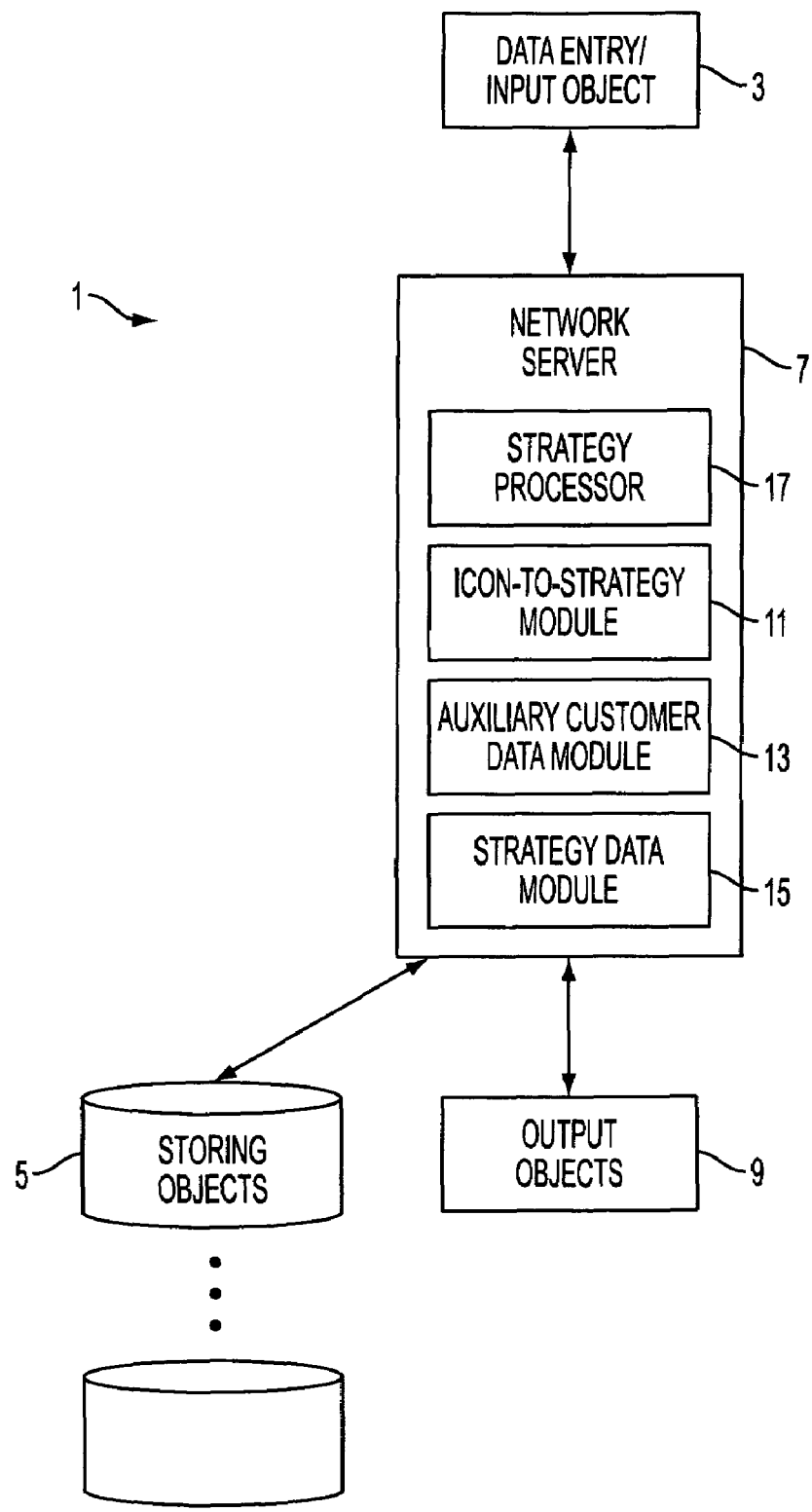
FIG. 1 is a block diagram of the system according to the present invention.

According to one preferred embodiment, the system and method of the present invention is accomplished by the system shown in FIG. 1. Referring to FIG. 1, system 1 includes data input object 3, storing object 5, network server 7 and output object 9. Data input object 3 operates to receive input from a variety of sources. As such, data input object 3 encompasses any device capable of inputting and receiving data, such as, but not limited to, input by way of a keyboard, keypad, coding mechanism, voice recognition, or any other electronic method. Preferably, data input object 3 is a keyboard or mouse operatively connected to a computer terminal with a display, where the computer functions as part of a client-server computer network.

Data received by data input object 3 is relayed to network server 7 which may store, compile and process various system modules and data. As shown in FIG. 1, according to one embodiment of the present invention, network server 7 includes strategy processor 17, icon-to-strategy module 11 (ITS Module), auxiliary customer data module 13, and strategy data module 15. Notably, this architecture is exemplary only and the system of the present invention can be implemented in a variety of different computer network types. For example, strategy processor 17, icon-to-strategy module 11 (ITS Module), auxiliary customer data module 13, and strategy data module 15 can reside on a stand alone computer which itself is operatively connected to storing object 5 and other system components shown and not shown. Or, for example, the system and method can be operated in an Internet-related environment where many or all of the system components discussed herein reside on or may be accessed by the way of the Internet.

Network server 7 will preferably interact with storing object 5, output source 9 and other components comprising or connected to the system, such as other servers and data terminals within the system, or other computer or telecommunications networks including the Internet. Storing object 5 stores data for the operation of the system. Storing object 5 comprises any medium capable of storing electronic data, including, but not limited to, databases, RAM, cache, CD or magnetic disk, or any combination thereof. According to one preferred embodiment, system 1 encompasses a number of storing object databases which interact and exchange information and data with network server 7. Output object 9 encompasses any device capable of outputting or transmitting data in any form. As such, output object 9 can be a printer, computer or computer display, modem, facsimile transmission or any other electronic or telecommunication device which performs a similar or related function. Notably, when data input object 3 includes a display, it may also function as an output object.

Figure 2:
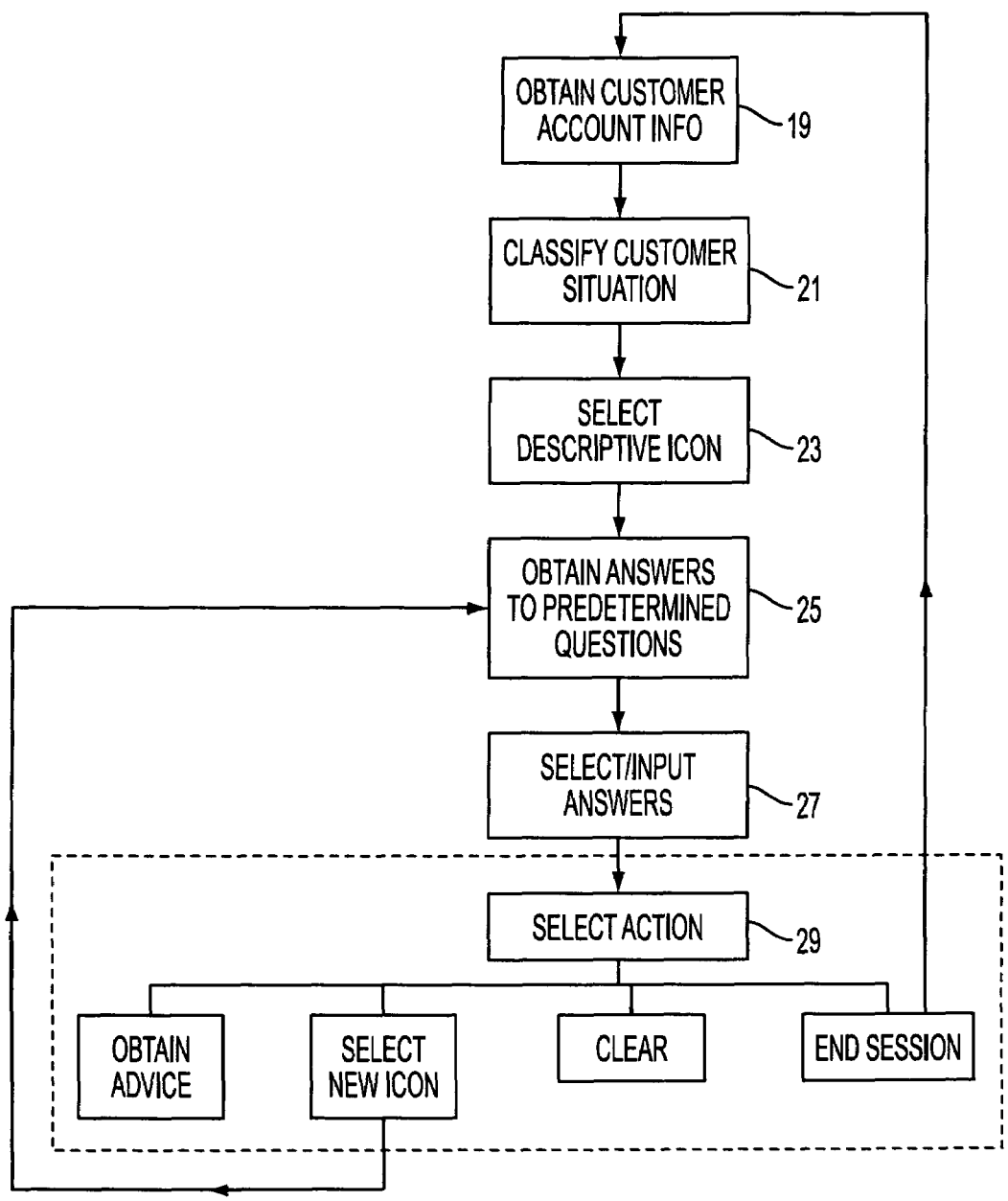
FIG. 2 is a flow chart illustrating the steps by which one embodiment of the present invention may be implemented.

FIG. 2 is a flow chart illustrating one set of general procedures by which the present invention may be implemented. The process begins when a CSR obtains a customer's account information from the system as shown in step 19 of FIG. 2. The information is preferably displayed on a CSR's computer screen as part of a graphical user interface (support GUI). After this account information is retrieved and displayed, the CSR engages the customer in a discussion in order to ascertain the exact nature of the customer's specific financial difficulties. Based on this discussion, the CSR then classifies the customer's situation according to a plurality of predetermined categories, referred to herein as call types, as shown in step 21. The CSR then selects a graphical descriptive icon displayed on the support GUI which most closely corresponds to the customer's situation, step 23 of FIG. 2. These descriptive icons are discussed in detail below. According to one embodiment, the CSR is then presented with another GUI comprising two main portions, one containing a set of predetermined questions and predetermined answers to those questions, and a second portion with space for displaying advice based on the answers to the predetermined questions. As shown in FIG. 2 step 25, the CSR obtains answers to the displayed questions from the customer. Next, the CSR selects predetermined answers appearing with the questions which most closely correspond to the answers received from the customer, as shown in step 27. The CSR then, as indicated by step 29 of FIG. 2, chooses from a variety of action items to either obtain advice from the system for the selected answers, obtain a new set of questions for a different call type by selecting a new descriptive icon, clear the screen or end the session.

Figure 3:
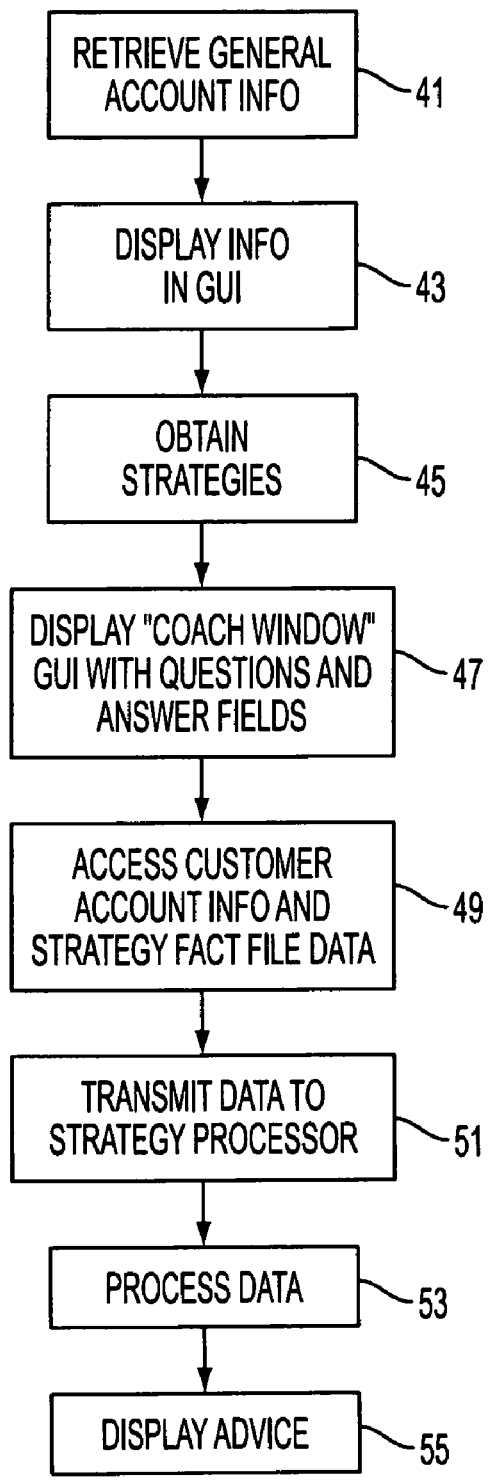
FIG. 3 is a flow chart illustrating the processing steps by which one embodiment of the present invention may be implemented.

This general system and procedure will now be explained in greater detail. As shown in FIG. 3 step 41, upon initial contact with a customer, a CSR uses data input object 3 to retrieve that customer's general account information from the system, where such data typically resides on storing object 5 or network server 7. This is done, for example, by obtaining from the customer and inputting into data input object 3 certain preliminary information, such as the customer's account number or social security number. As shown by step 43, the retrieved customer information is preferably shown, along with other data, as part of a support, graphical user interface GUI 57 (support GUI). FIG. 4 illustrates a support GUI 57 according to the present invention. Support GUI 57 is preferably comprised of a number of sub panels with each panel containing graphical and/or textual information related to the customer and the system's operation. The GUI of FIG. 4, for example, contains distinct panels containing personal information on the customer 59, a calendar 61, a system control panel 63 for further interaction with the system, and a group of descriptive icons 65 according to the present invention.

Once the customer's general information is retrieved and displayed, a CSR then engages the customer in a discussion and attempts to elicit comments from the customer about the state of his or her current economic circumstance, as shown in FIG. 2 step 19. By this personal interaction, the CSR obtains an accurate picture of the customer's economic problem. For example, during such a discussion a customer may inform the CSR that he or she cannot make upcoming, scheduled payments for the balance of his or her credit card debt because either the customer or someone in the customer's household recently lost their job. Or, in some instances, a customer may simply state that they will not pay this credit card debt and offer no explanation to the CSR at all.

Based upon the customer's comments or lack thereof, a CSR then selects a specific descriptive icon from the group of icons 65. Each descriptive icon represents a distinct scenario reflecting either or both a customer's economic position and interactive response with the CSR. For example, as depicted in FIG. 4, there may exist descriptive icons for a customer who cannot make scheduled credit card payments due to bankruptcy 67, a reduction of income 69, lack of money 71, refusal to pay 73 or lack of motivation 75. As noted above, each customer circumstance represented by a descriptive icon is generally referred to as a call type. Significantly, although FIG. 4 and other figures illustrate only the five call type descriptive icons noted above, the system and method of the present invention can encompass any number and variety of descriptive icons and associated call types and is in no way limited by the call types and descriptive icons discussed herein.

Accordingly, based on the customer's preliminary explanation, or lack of explanation, of why he or she cannot pay their existing debt, the CSR will select, as shown in FIG. 2 step 23, a descriptive icon that most closely corresponds with the scenario determined during the ensuing customer contact. Thus, referring to the foregoing example of a customer who cannot make payments because he or she has lost his or her job, a CSR will select the descriptive icon labeled "Reduced Income" 69.

Referring to FIG. 3, when a CSR initially requests a customer's preliminary account information as shown in step 19 of FIG. 2, the system retrieves the data from storing object 5 on which the data resides as shown in step 41 of FIG. 3. The system then displays the information in support GUI 57 as shown in step 43. After the CSR chooses a descriptive icon, ITS Module 11 operates to obtain from the system a preliminary set of predetermined strategies that map to the icon chosen, as indicated by step 45. These predetermined strategies are preferably contained within a configuration parameter file which, preferably, resides on network server 7. Each strategy encapsulates specific knowledge and decision points which relate to the subject of the descriptive icon chosen.

The preliminary set of predetermined strategies and corresponding parameters retrieved by ITS Module 11, are formatted and displayed in another GUI referred hereinafter as a coach window, as shown in FIG. 3 step 47. Such a coach window 77 is shown in FIG. 5. Notably, according to one embodiment of the present invention, coach window 77 may be superimposed on support GUI 57, such that the coach window overlays one or more panels of the support GUI. For example, FIG. 5 shows a preferred coach window for the "Reduced Income" descriptive icon call type superimposed over the lower left portion of support GUI 57. A coach window can be repositioned anywhere on the CSR's display by dragging the window using known techniques. This allows the CSR to have ready access to customer information displayed on support GUI 57.

Referring again to FIG. 5, one preferred embodiment of using and displaying a coach window is illustrated. In this embodiment, coach window 77 is separated into two main components, query panel 79 and advice panel 81. Query panel 79 contains within it one or more questions which the CSR needs to obtain answers to during interaction with the customer. The questions correspond to the strategies retrieved by ITS Module 11 which themselves correspond to specific call type parameters related to the descriptive icon selected by the CSR. For example, questions in query panel 79 of FIG. 5 are those pertinent to the "Reduced Income" call type, such as questions related to reasons for the customer's reduction income, the estimated time frame for the income reduction, and means by which the customer plans to remedy the situation, if any. Under each question are one or more predetermined answers each with its own radio button, such as radio buttons 83. The CSR selects the radio button for the predetermined answer which most closely corresponds to the customer's situation, as indicated by step 27 of FIG. 2. As shown, radio button 83 is a graphical circle which, when selected by the CSR using a mouse of some other device, is filled-in to indicate visually that the button has been selected. Although radio buttons are shown and described herein for this purpose, other known techniques of indicating the selection of an item can be used to accomplish the same result.

Figure 7:
FIG. 7 depicts another coach window according to the present invention showing a query panel and advice panel.

After a CSR completes the questioning process and selection of predetermined answers, the CSR selects the graphical button 85 labeled "Advice," as shown in FIG. 2 step 29 ("Obtain Advice"). Selecting graphical "Advice" button 85 causes the system to access the customer's account information via auxiliary customer information module 13, access strategy fact file data via strategy data module 15. These processing steps are depicted in FIG. 3 step 49. This retrieved data is then transmitted to strategy processor 17 as shown in step 51 of FIG. 3 where strategy processor 17 processes the information, as shown in step 53 of FIG. 3, and generates advice related to payment options most suitable to the customer's situation and advice on how to further negotiate and interact with the customer. The payment options and advice generated by strategy processor 17 are displayed on the CSRs computer screen, as shown in step 55. More specifically, as shown in FIG. 7, these payment options and advice are displayed in the advice panel 87 of coach window 91 along side query panel 93. Once the advice is displayed, the CSR may then choose from among the advice prompts to provide the customer with information regarding payment options and other related information. Examples of such advice prompts are shown in advice panel 87 of FIG. 7.

Referring to FIG. 5, in order to facilitate the advisory process, coach windows also display in addition to the query and advice panels, a number of other graphical buttons. As shown in FIG. 5, one such button is "Clear All" graphical button 95. This button is preferably present on all coach window types. When selected, the system clears all of the radio button selections for the predetermined answers to the questions shown in the query panel for the current call type selected. In this way, the system permits a CSR to obtain multiple advice prompts for a given call type without the need to reinitiate the process from the very beginning.

Referring to FIG. 5 again, the coach window also displays the group of descriptive icons 97 for the call types enabled by the system. In this way, a CSR is able to switch between call types at any time during the course of a customer contact. Thus, for example, after completing all of the questions for a given call type and generating advice specific to the answers to those questions, a CSR can then select another call type and repeat the process. According to one embodiment, as long as the CSR does not select "Clear All" graphical button 95 on a coach window, the system will retain all of the payment option suggestions and advice for all queries made for each call from which advice was generated.

Should a CSR wish to end a session, the "Close" graphical button 99 shown in FIG. 5 may be selected. When this button is selected, the system closes the current coach window and causes the support GUI 57 to be displayed. According to one preferred embodiment, however, query information contained in a query panel or advice contained in a advice panel are retained as long as "Clear All" button 95 is not selected.

As noted above, the system of the present invention preferably comprises at least the five call types depicted by descriptive icons 67, 69, 71, 73 and 75. Referring to FIG. 5, the coach window corresponding to the "Income Reduced" descriptive icon 69 call type is displayed. According to one preferred embodiment, the query panel contains questions as to why the customer's income has been reduced, the time frame within the situation is expected to improve and how the customer plans to handle the situation. These questions are exemplary only, and any number and type of question may be asked. Also, according to one preferred embodiment, radio buttons for predetermined answers corresponding to query panel questions are provided for selection by the CSR. Numerical entry or other entry field types may be used for the selection of answers, together with, or in lieu of, the radio buttons.

Figure 6:
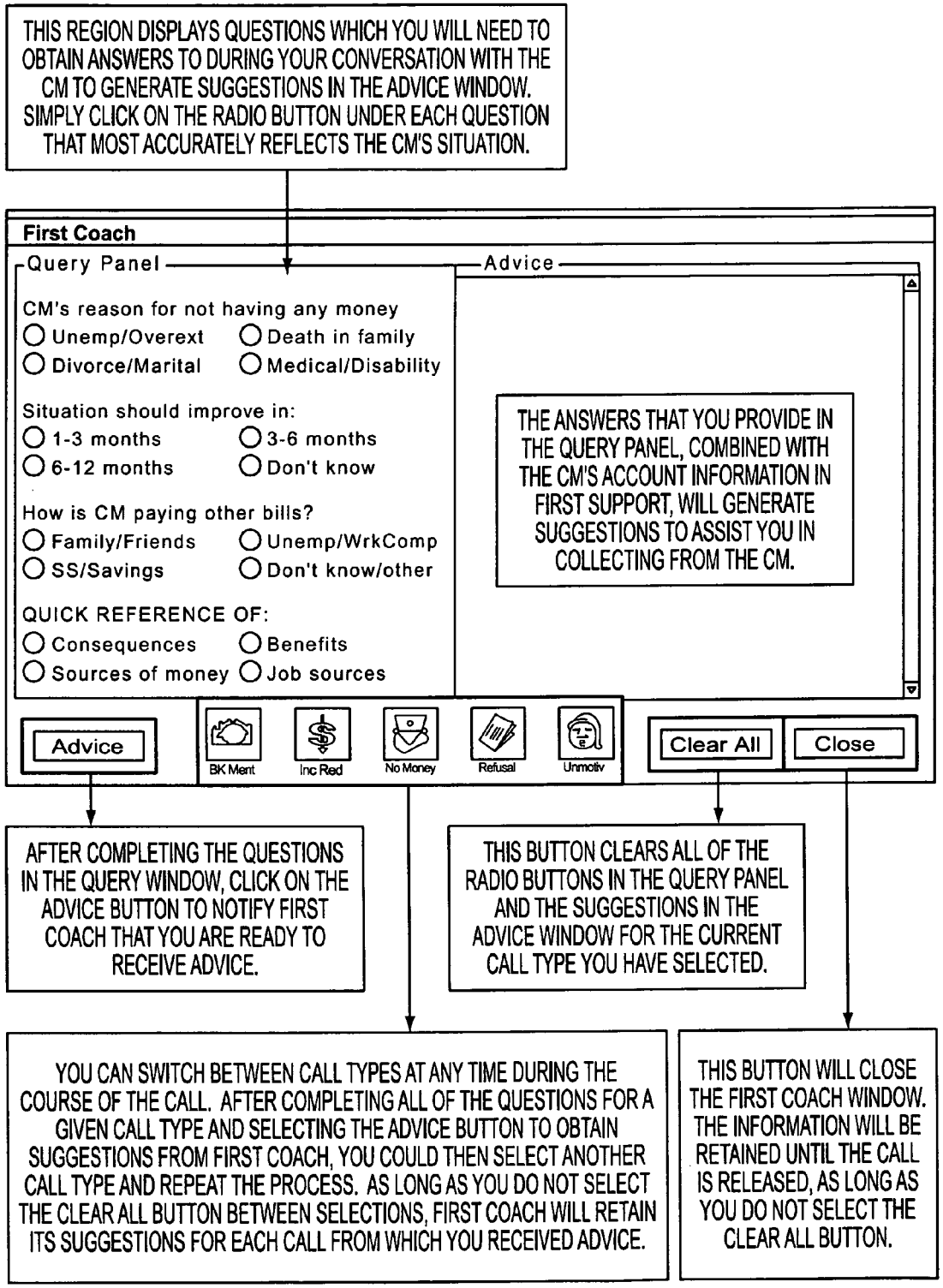
FIG. 6 depicts another coach window according to the present invention showing a query panel and advice panel.

Referring to FIG. 6, the coach window corresponding to the "No Money" descriptive icon 71 call type is displayed. According to one preferred embodiment, the query panel contains questions as to why the customer has no money, whether and at what time the customer's situation may improve and how the customer is paying his or her other bills, if at all. These questions are exemplary only, and any number and type of question may be asked. Also, according to one preferred embodiment, radio buttons for predetermined answers corresponding to query panel questions are provided for selection by the CSR. Numerical entry or other entry field types may be used for the selection of answers, together with, or in lieu of, the radio buttons.

Referring to FIG. 7, the coach window corresponding to the "Bankruptcy" descriptive icon 67 call type is displayed. According to one preferred embodiment, the query panel preferably contains questions as to whether the customer has retained an attorney, why the customer is planning to file for bankruptcy and at what time the customer's situation may improve. These questions are exemplary only, and any number and type of question may be asked. Also, according to one preferred embodiment, radio buttons for predetermined answers corresponding to query panel questions are provided for selection by the CSR. Numerical entry or other entry field types may be used for the selection of answers, together with, or in lieu of, the radio buttons.

Referring to FIG. 8, the coach window corresponding to the "Refusal to Pay" descriptive icon 73 call type is displayed. According to one preferred embodiment, the query panel preferably contains questions as to why the customer refuses to pay his debt, what dispute, if any, the customer has with another party from which the debt arises and whether or not the customer is dissatisfied in some way. These questions are exemplary only, and any number and type of question may be asked. Also, according to one preferred embodiment, radio buttons for predetermined answers corresponding to query panel questions are provided for selection by the CSR. Numerical entry or other entry field types may be used for the selection of answers, together with, or in lieu of, the radio buttons.

According to one embodiment, the selection of certain predetermined answers will require that certain related questions appearing in the query panel be answered before advice may be properly requested and generated. For example, if a customer were to indicate that he or she was refusing to pay his debt because of some dispute, the CSR would need to select an answer to the question directed to disputes. In such an instance, it is not required that all questioned be answered for the system to be able to generate and display relevant advice.

Referring to FIG. 9, the coach window corresponding to the "Unmotivated" descriptive icon 75 call type is displayed. According to one preferred embodiment, the query panel preferably contains questions as to why the customer is unmotivated, whether the customer fits one or more predetermined profiles whether the customer is able to pay his debts. These questions are exemplary only, and any number and type of question may be asked. Also, according to one preferred embodiment, radio buttons for predetermined answers corresponding to query panel questions are provided for selection by the CSR. Numerical entry or other entry field types may be used for the selection of answers, together with, or in lieu of, the radio buttons.

The query panel on a coach window may also include in addition to questions and their associated predetermined answers, a reference prompt with radio buttons associated with various related topics and categories related to a certain call type. According to one embodiment, these reference prompts allow a CSR to limit the number of feedback categories of financial and negotiation related statements provided in the respective advice panels of the various coach window call types. The query panel of FIG. 9 illustrates one such reference prompt 101. Thus, for example, by selecting radio button 103 for "Benefits," the system will retrieve and display advice limited to the benefits of payment and bringing the customer's account current. Preferably, multiple categories may be selected at any given time, thereby allowing a CSR to manipulate the advice feedback that is most pertinent to a customer's situation.

Other embodiments, features and uses of the present invention will be apparent to those skilled in the art from a consideration of the specification, accompanying drawings and practice of the invention disclosed herein. Accordingly, the specification and examples set forth above should be considered exemplary only. The scope of the invention is limited only by the claims appended hereto.

What is claimed is:

1. A system for providing negotiation advice to a customer service representative to negotiate with an individual delinquent on a debt obligation, the negotiation advice regarding alternative payment options specifically tailored to the individual's economic situation, said system comprising:

an interactive user application running on a computer, said computer having a display operatively connected to said computer;

a first graphical user interface (GUI) displayed on said display of said computer, said first GUI comprising one or more descriptive icons, said descriptive icons representing one or more financial situations;

a second GUI displayed on said display of said computer based on selection of one of said descriptive icons, said second GUI comprising one or more questions related to strategies for addressing the financial situation represented by the selected one of said descriptive icons; and a processor, said processor operative to generate negotiation advice in response to selection of answers to said one or more questions that most closely correspond to a particular financial situation, said advice related to alternative payment options most suitable to said particular financial situation and displayed on said display.

2. The system of claim 1 wherein said computer operates within a network, said network comprising a plurality of fileservers, said fileservers comprising a plurality of databases.

3. The system of claim 1 wherein said negotiation advice includes advice for interacting with an individual in said particular financial situation.

4. The system of claim 1 wherein said second GUI displays predetermined answers to said one or more questions.

5. The system of claim 1 wherein said second GUI further comprises a panel for displaying said advice and a panel for displaying said questions.

6. The system of claim 1 wherein said second GUI further comprises buttons for selecting said answers.

7. The system of claim 1 wherein said second GUI comprises means for specifying the type of said advice generated by said system.

8. In a computer system comprising a CPU, RAM and a display, a method of providing negotiation advice to a customer service representative to negotiate with an individual delinquent on a debt obligation, the negotiation advice regarding alternative payment options specifically tailored to the individual's economic situation, comprising the steps of:

retrieving said individual's account information;

displaying said account information on a first graphical user interface (GUI) on said display;

retrieving strategy data in response to the selection of a descriptive icon, said descriptive icon representing one financial situation, said strategy data addressing said one financial situation, where said descriptive icon is displayed as part of said first GUI;

displaying, after the selection of said descriptive icon, a second GUI on said display, where one or more questions corresponding to said strategy data are displayed as part of said second GUI;

retrieving negotiation advice related to selected answers to said questions that most closely correspond to said economic situation; and displaying said negotiation advice on said display, said negotiation advice related to alternative payment options most suitable to said economic situation.

9. The method of claim 8 wherein said negotiation advice includes advice for interacting with said individual.

10. The method of claim 8 wherein multiple answers to each of said questions are displayed as part of said second GUI.

11. A method for negotiating with an individual delinquent on a debt obligation, comprising the steps of:

obtaining information related to said individual from an advice generation system;

ascertaining circumstances of said individual's economic situation;

classifying said individual's economic situation by selecting a descriptive icon representing said individual's economic situation from a plurality of descriptive icons displayed on a first graphical user interface (GUI) of said advice generation system;

ascertaining further circumstances of said individual's economic situation related to questions displayed on a second GUI of said advice generation system;

inputting answers to said questions to said advice generation system; and receiving negotiation advice related to alternative payment options most suitable to said individual's economic situation.

12. The method of claim 11 further comprising the step of specifying the type of said advice to receive from said advice generation system.

13. A system running an interactive user application for providing negotiation advice to a customer service representative to negotiate with an individual delinquent on a debt obligation, the negotiation advice regarding alternative payment options specifically tailored to the individual's economic situation, said system comprising:

a computer;

a display operatively connected to said computer;

a storage device operatively connected to said computer;

an input device operatively connected to said computer;

a first graphical user interface (GUI) displayed on said display by said computer, said first GUI displaying information from said storage device, said first GUI displaying descriptive icons selectable with said input device, said descriptive icons each representing a general financial situation; and a second GUI displayed on said display by said computer based on input from said input device, said second GUI displaying one or more questions related to strategies for addressing the particular general financial situation represented by a selected one of said descriptive icons, said second GUI further displaying negotiation advice in response to a selection of answers to said one or more questions, said negotiation advice related to alternative payment options most suitable to said particular general financial situation and to a particular specific financial situation corresponding to said selection of answers.

14. The system of claim 13 wherein said negotiation advice includes advice for interacting with an individual in said particular specific financial situation.

15. The system of claim 13 wherein said computer receives from said input device a selection of the type of advice to be displayed by said second GUI.

* * * * *